United States Patent [19]

Iijima

[11] Patent Number: 4,472,803

[45] Date of Patent: Sep. 18, 1984

[54] DIGITAL TRANSMITTING SYSTEM

[75] Inventor: Yukihiko Iijima, Tokyo, Japan

[73] Assignee: Nippon Electric Co., Ltd., Tokyo, Japan

[21] Appl. No.: 427,917

[22] Filed: Sep. 29, 1982

[30] Foreign Application Priority Data

Oct. 5, 1981 [JP] Japan ............................... 56-158418

[51] Int. Cl.³ .............................................. H04J 3/12
[52] U.S. Cl. ................................... 370/110.1; 370/84; 358/146
[58] Field of Search ...................... 370/110.1, 76, 84; 358/146, 142, 141

[56] References Cited

U.S. PATENT DOCUMENTS 4,215,369 7/1980 Iijima .................................. 358/146
4,392,234 7/1983 Maruta .................................. 370/84

Primary Examiner—Douglas W. Olms
Attorney, Agent, or Firm—Blakely, Sokoloff, Taylor & Zafman

[57] ABSTRACT

In a digital transmitting system wherein signal information is transmitted from a transmission buffer memory device to a receiving buffer memory device through a transmission line extending therebetween, there are provided a counter for producing count information proportional to a sum of information transmission delay times in the transmission and receiving buffer memory devices, and a read control circuit which controls the read-out time of the information from the receiving buffer memory device such that a count of the counter coincides with a predetermined reference value, thereby rendering a sum of the information transmission delay times coincident with a predetermined time.

8 Claims, 4 Drawing Figures

DIGITAL TRANSMITTING SYSTEM

BACKGROUND OF THE INVENTION

This invention relates to a digital transmitting system, and more particularly a digital transmitting system having a buffer memory device adapted to temporarily store information and then read out the information, when the speeds of generation and transmission of the information vary irregularly with time.

DESCRIPTION OF THE PRIOR ART

Where a voice signal or a video signal is encoded at high efficiency and then transmitted, in most cases, an encoding system has been used in which the speed of generation of the encoded signal is not constant but varies with time depending upon the characteristic of an input signal. In the transmitting system utilizing such an encoding system, buffer memory devices are provided on the transmitting side and the receiving side to perform speed conversion between the information generating speed and the information transmitting speed and between the information transmitting speed and the information reproducing speed as well. In such a system, in order to correctly reproduce the information on the receiving side without partially losing or overlapping the information, it is necessary to make constant the interval between a time at which the generated information is written into the buffer memory device on the transmitting side and a time at which the information is transmitted and read out of the buffer memory device on the receiving side, that is, the information transmission delay time between the buffer memory devices on the transmitting and the receiving sides.

As will be discussed later in more detail with reference to the accompanying drawings, a prior art digital transmitting system can not be used in a case wherein the information transmission speed varies with time.

SUMMARY OF THE INVENTION

Accordingly, it is a principal object of this invention to provide an improved digital transmitting system that can correctly transmit information without adding a complicated and elaborate circuit even when the information transmission speed of a transmission line varies with time.

According to this invention, there is provided a digital transmitting system comprising a transmission buffer memory device provided on a transmission side for effecting speed conversion between speeds of generation of communication information to be transmitted and of transmission thereof; a receiving buffer memory device provided on a receiving side for effecting speed conversion between the transmission speed and the reproducing speed of the communication information; the transmission side being provided with first counting means counting the number of pulse signals having a predetermined period; first multiplexing means which multiplexes count information outputted from the first counting means and communication information at a predetermined interval and sends multiplexed information to the transmission buffer memory device; first information separating means receiving the multiplexed information to separate the communication information from the count information; and transmitting means which, when the first information separating means outputs the count information, subtracts the count information outputted from the first information separating means from the count information outputted from the first counting means and multiplexes resulting difference count information and the communication information sent from the first separating means for transmission of the thus multiplexed information; and the receiving side being provided with receiving means receiving the multiplexed information to separate the communication information from the count information for transmission of the thus separated information; second counting means counting the number of the pulse signals having the predetermined period; second multiplexing means which, when the receiving means transmits the count information, multiplexes difference count information formed by subtracting the count information outputted from the second counting means from the thus transmitted count information and the communication information outputted from the transmitting means and which sends the thus multiplexed information to the receiving buffer memory device; second information separating means receiving the multiplexed information from the receiving buffer memory device to separate the communication information from the count information for transmission; means for comparing a sum of the count information outputted from the second counting means and the information outputted from the second separating means with a predetermined reference value when the second separating means transmits the count information; and control means for setting a time for reproducing the communication information being transmitted from the receiving buffer memory device such that the delay time in transmission of the communication information between the transmission and receiving buffer memory devices will be in a predetermined range.

BRIEF DESCRIPTION OF THE DRAWINGS

In the accompanying drawings

DESCRIPTION OF THE PREFERRED EMBODIMENT

Before describing the invention, a prior art digital transmitting system will first be described.

Figure 1:
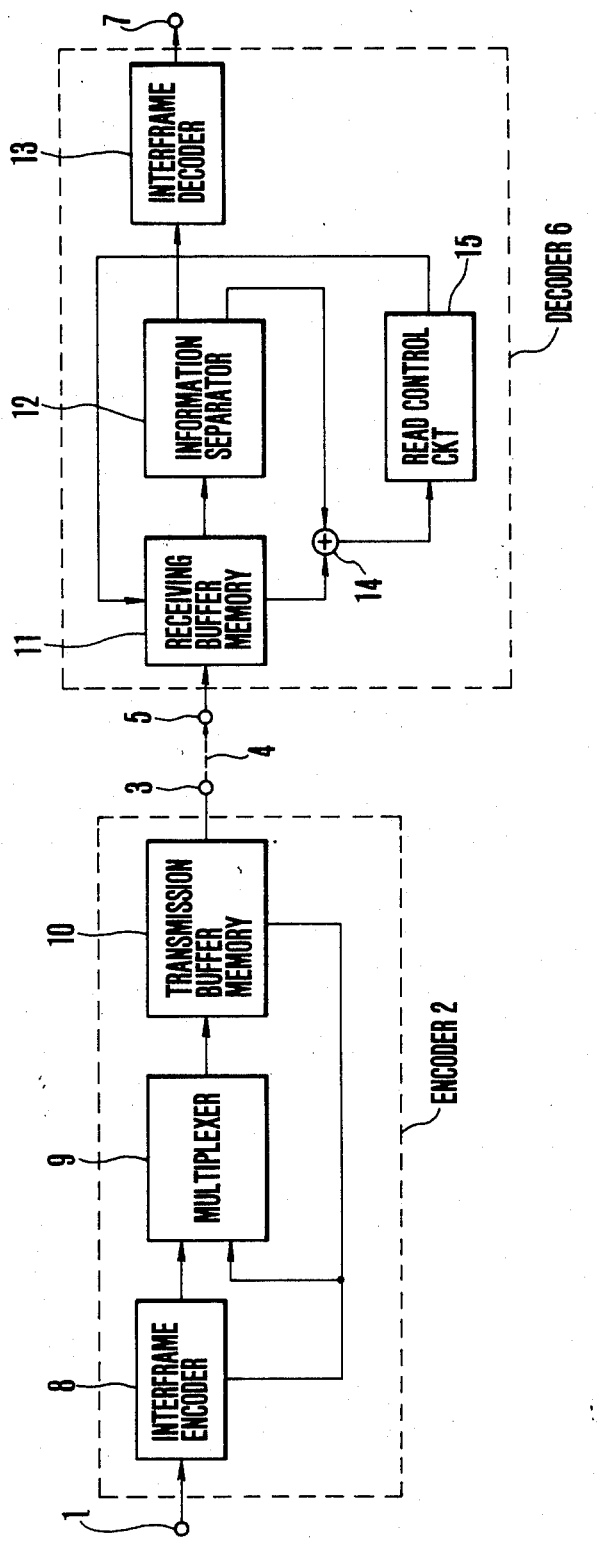
FIG. 1 is a block diagram showing a prior art digital transmitting system.

A prior art digital transmitting system shown in FIG. 1 is constructed to encode a video signal by an interframe encoding system and the encoded video signal is then transmitted. On the transmitting side, a video signal inputted to an input terminal 1 is sent to an encoder 2 to be encoded and the encoded information is sent out to a transmission line 4 through an output terminal 3 at a predetermined constant speed. The information sent over the transmission line 4 and received at an input terminal 5 of the receiving side is decoded by a decoder 6 and then outputted through an output terminal 7.

The decoder 2 comprises an interframe encoder 8 which encodes in interframe fashion the video signal received at the input terminal 1 and sends the encoded signal to a multiplexer 9 which multiplexes, on the time division basis, the encoded information and control information sent from a transmission buffer memory device 10 and added with identifying code information. When the multiplexed information accumulates a predetermined bit number, the multiplexer 9 sends the multiplexed informations to the transmission buffer memory device 10 together with a write pulse. The transmission buffer memory device 10 includes a write address generator and a read address generator (not shown) respectively designating an information write address and an information read address. In the response to the write pulse, the transmission buffer memory device 10 writes multiplexed information sent together with the write pulse in a write address designated by the write address generator and then advances by one address the write address designated by the write address generator to prepare for the next writing. In response to a read out pulse having a speed corresponding to an information transmission speed in the transmitting line 4, the transmission buffer memory device 10 reads out the multiplexed informations stored in addresses designated by the read address generator at each read out pulse and sends the read out information to the transmission line 4 through the output terminal 3. Then, the transmission buffer memory device 10 advances by one address the read out address designated by the read address generator to prepare for the next reading. Furthermore, the transmission buffer memory device 10 supplies the quantity of information accumulated which is defined by the difference between the write address and the read address to the interframe encoder 8 and the multiplexer 9 which accumulated information quantity acts as a control signal. When supplied with the control signal, the interframe encoder 8 varies an encoding parameter in a predetermined range in accordance with the magnitude of the accumulated information quantity for controlling the speed of generation of the encoding information so as to prevent the multiplexed information temprorarily stored in the transmission buffer memory device from being lost or overlapped.

Figure 2:
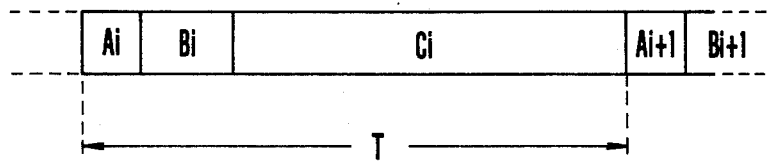
FIG. 2 is a timing chart illustrating multiplexed signals utilized in the system shown in FIG. 1.

As shown by the timing chart in FIG. 2, the multiplexed information sent out of the multiplexer 9 shown in FIG. 1 is information formed by multiplexing, on the time division basis, a control signal Bi sent from the transmission buffer memory device 10 before encoded information Ci supplied from the interframe encoder 8 and identifying code information Ai selected to be different from the encoding information Ci. In this multiplexed information, the identifying code information, the control information and the encoded information appear successively at each predetermined period T (in second). Since the encoding information Ci is obtained by encoding in an interframe fashion, a video signal within the period T, the quantity of the encoded signals within one period T diffuse as the interframe correlation of the video signal varies with time. Accordingly, the quantity of the encoded information written in the transmission buffer memory device 10 shown in FIG. 1 within one period T, that is, the speed of generating the information varies with time. The identifying code information Ai is added for the purpose of discriminating the control information Bi from the encoding information Ci.

A receiving buffer memory device 11 of the decoder 6 on the receiving side of the system shown in FIG. 1 writes and stores the multiplexed information received at the input terminal 5 in an address designated by a write address generator contained in the decoder 6, in response to a write pulse synchronized with the read pulse of the transmission buffer memory device 10 and thereafter advances the write address, by one address, designated by the write address generator to prepare for the next writing. The receiving buffer memory device 11 which is connected to receive a read out pulse from a read control circuit 15 to read out the multiplexed information stored in an address designated by a read address generator contained in the decoder 6, in response to each read out pulse, transmits the read-out multiplexed information to an information separator circuit 12 and then advances, by one address, the write address designated by the write address generator to prepare for the next writing. The receiving buffer memory device 11 also transmits the accumulated information quantity to an adder 14. The information separator 12 detects the identifying code information contained in the multiplexed information sent from the receiving buffer memory device 11 to separate the control information from the coded information and sends the control signal to the adder 14 and the coded information to an interframe decoder 13 which decodes the coded information into a video signal to output it through the output terminal 7. The adder 14 adds the quantity of the accumulated information from the receiving buffer memory device 11 to the control information sent from the information separator 12, that is, the quantity of the accumulated information in the transmission buffer memory device 10 and sends a sum signal to the read control circuit 15. The read control circuit 15 is supplied with information sent from the adder 14 and representing the sum of the accumulated information in the transmission and receiving buffer memory devices 10 and 11 so as to control the read out or reproducing time of the information in the receiving buffer memory device 11 such that the sum information will become a predetermined value. Let us denote the information transmission delay times of the transmission and receiving buffer memory devices 10 and 11 by $\eta_1$ (sec.) and $\eta_2$ (sec.) respectively, and the sum thereof by $\eta = \eta_1 + \eta_2$. Further, let us denote the information transmission speeds at the output terminal 3 on the transmitting side and at the input terminal 5 on the receiving side at time t by $V_s(1)$ and $V_R(t)$ respectively and the information transmission delay time in the transmission line 4 by $\delta$ (sec.). Then, the following equation holds $$V_s(t) = V_R(t+\delta) \qquad (1)$$

In this case, the information transmission delay time $\sigma$ (sec.) between the transmission and receiving buffer memory devices 10 and 11 becomes $$\sigma = \eta + \delta \qquad (2)$$

Where the quantities of the accumulated information in the transmission and receiving buffer memory devices 10 and 11 at time T are $B_s(t)$ and $B_R(t)$ respectively, the following equation holds $$B_s(t - \sigma) + B_R(t) = \int_{t+\delta}^{t+\sigma} V_R(\tau) d\tau. \qquad (3)$$

Since in the system shown in FIG. 1, the information transmission speed in the transmission line 4 is constant, i.e., it does not vary with time, if $V_r(t) = V_0$, the integrated value of the righthand term of equation (3) would become equal to $\eta V_0$. On the other hand, at time t, since the adder 14 produces $B_s(t-\delta) + B_R(t)$, that is, the quantity of the accumulated information expressed by the lefthand term of equation (3), in response to this accumulated quantity of the information, the read control circuit 15 reads in vain the multiplexed information of the receiving buffer memory device 11 (that is, temporarily stops reading out of the multiplexed information) so as to satisfy equation (3) when the accumulated quantity of the information is larger or smaller than $\eta V_O$. When the accumulated information quantity sent from the adder 14 is equal to $\eta V_O$, a read out pulse synchronous with the write pulse of the transmission buffer memory device 10 is sent to the receiving buffer memory device 11 to read out the multiplexed information in a manner described above. As described above, by controlling the time for reproduction of the information, it is possible to control the information transmission delay time $\sigma$(sec) between the transmission and receiving buffer memory devices 10 and 11 to a predetermined value, thereby ensuring correct transmission of the information.

In the prior art digital transmitting system described above, information indicative of the accumulated information quantity in the transmission buffer memory device 10 and that in the receiving buffer memory device 11 are added together on the receiving side to form information representative of the accumulated information quantity; and by controlling the time for reproducing the information from the receiving buffer memory device such that the accumulated information quantity will have a predetermined value, it becomes possible to correctly transmit the information when the information transmission speed is constant so that the information transmission delay time between the transmission and receiving buffer memory devices has a predetermined value. However, this prior art digital transmission system is not applicable to a case where the information transmission speed in the transmission line varies with time so that it is necessary to add a complicated circuit of a large scale in order to obtain the righthand term of equation (3), i.e., the constant integrated value of the information transmission speed in the transmission line. For example, a circuit arrangement for measuring the buffer information as disclosed in U.S. Pat. No. 4,215,369 employs a timer (8 in FIG. 1) for direct measurement of the time interval ranging from writing of the video synchronizing signal into a buffer (6) to reading thereof from the buffer and detection of the read-out signal by a detector circuit (9). This circuit arrangement has a complicated hardware as a whole.

Figure 3:
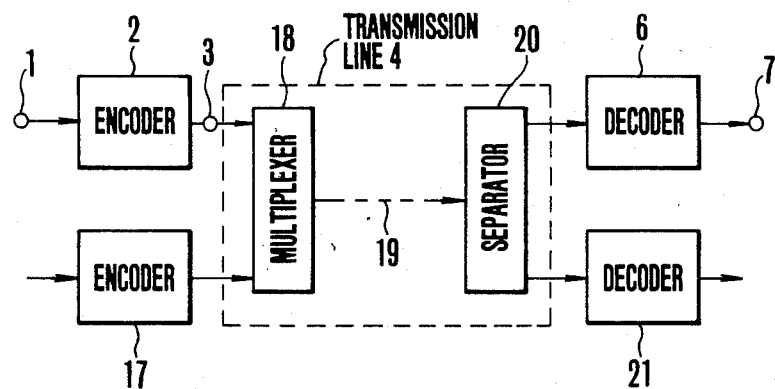
FIG. 3 is a block diagram showing a transmitting system wherein the information transmission speed in the transmitting line varies with time.

FIG. 3 is a block diagram illustrating another prior art transmission system in which the information transmission speed in a transmission line varies with time. In FIG. 3, the transmission line 4 is constituted by a multiplexer 18, a repeating transmission line 19, and a separator 20.

A television signal is applied to an input terminal 1 on the transmitting side and encoded by an encoder 2 and then sent to the multiplexer 18 via an output terminal 3. An encoder 17 encodes a facsimile signal supplied therto and applies the encoded signal to the multiplexer 18 which multiplexes, on the time division basis, the encoded television and facsimile information and sends the multiplexed information to the repeating transmission line 19.

On the receiving side, a separator 20 receives the multiplexed information sent over the repeating transmission line 19 to separate the coded television information from the facsimile coded information for transmission thereof to decoders 6 and 21, respectively.

The decoder 6 produces at an output terminal 7 a television signal obtained by decoding the coded television information, while the decoder 21 sends out a facsimile signal obtained by decoding the coded facsimile information. With this system, the facsimilie signalis intermittently transmitted while the television signal is being transmitted continuously. Since the information transmission speed in the repeating transmission line 19 is constant, for efficient usage of the transmission line 4, the information is transmitted such that, when the facsimile signal is not transmitted, the coded television signal is transmitted at an information transmission speed of the repeating transmission line 19 whereas when the facsimile signal is transmitted, the sum of the transmission speeds of the coded television information and coded facsimile information would be equal to the information transmission speed of the repeating transmission line 19, that is, the transmission speed of the coded television information is decreased by the transmission speed of the coded facsimile information. Where the information transmission speed assigned to the transmission line 4 varies with time as in the case of transmitting the television signal, the digital transmission system shown in FIG. 3 can not be used.

Accordingly, the invention contemplates the provision of an improved digital transmitting system capable of correctly transmitting information even when the information transmission speed of a transmission line varies with time, without the necessity of adding a complicated circuit.

Figure 4:
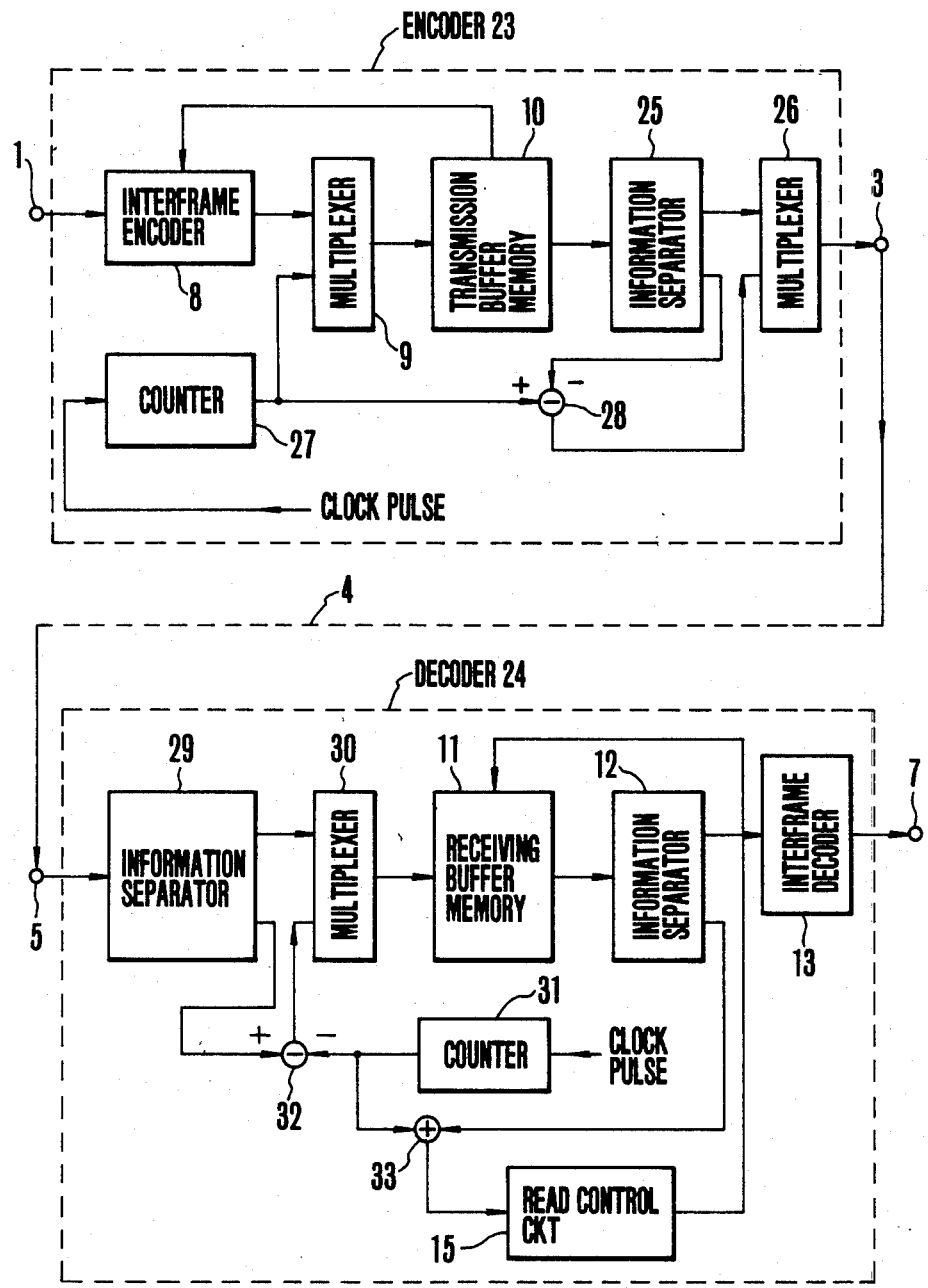
FIG. 4 is a block diagram showing a digital transmitting system embodying the invention.

In this block diagram shown in FIG. 4 illustrating a preferred embodiment of this invention, video signals are encoded by an interframe encoding system for transmission. More particularly, a video signal inputted to an input terminal 1 on the transmission side is sent to an interframe encoder 8 of an encoder 23 to be subjected to an interframe coding for production of coded information which is sent to a multiplexer 9. A counter 27 is supplied with a clock pulse of predetermined period C (second) to count the number of the clock pulses for sending the count information to the multiplexer 9 and a subtractor 28. The multiplexer 9 multiplexes, at each predetermined period T (second) on the time division basis, the coded information sent from the interframe encoder 8 and the count information sent from the counter 27 and added with identifying code information and sends the multiplexed information to a transmission buffer memory device 10 together with a write pulse. The transmission buffer memory device 10 writes and stores the multiplexed information in addresses designated by a write address generator, not shown, each time the buffer memory device 10 is supplied with the write pulse and the multiplexed information from the multiplexer 9 and then advances the address, by one address, the write address designated by the write address generator to prepare for the next writing. In response to a read out pulse having a speed corresponding to the information transmission speed in a transmission line 4, the transmission buffer memory device 10 reads out multiplexed information stored in the address designated by the read address generator each time a read out pulse is applied so as to send the read-out information to an information separator 25. Thereafter the transmission buffer memory device 10 advances, by one address, the address designated by the read address generator to prepare for the next reading. Furthermore, the transmission buffer memory device 10 sends to the interframe encoder 8 the information representing the quantity of accumulated information in the memory device 10 for controlling the speed of generation of the coded information. The information separator 25 receives the multiplexed information sent from the transmission buffer memory device 10 and detects the identifying code information so as to separate the count information from the coded information. The count information is sent to the subtractor 28, while the coded information is sent to a multiplexer 26. The subtractor 28 subtracts the count information (M1) sent from the information separator 25 from the count information (M2) outputted from the counter 27 and sends difference count information (M2−M1) to the multiplexer 26. The multiplexer 26 multiplexes, on the time division bases, the coded information sent from the information separator 25 and information obtained by adding the identifying code information to the count inormation sent from the subtractor 28 and sends the multiplexed information to the transmission line 4 via an output terminal 3 in accordance with a clock pulse having a speed corresponding to the information transmission speed in the transmission line 4. The fact that the count information (M2) is sent out of the counter 27 at the time when the count information (M1) is sent out of the information separator 25 means that the counter 27 counts (M2−M1) clock pulses during an interval between writing and reading of the count information (M1) into and out of the transmission buffer memory device 10. Accordingly, the product (M2−M1)×C of the count information sent to the multiplexer 26 from the subtractor 28 and the period C (second) of the clock pulse supplied to the counter 27 is equal to the information transmission delay time $\eta_1$ (second) in the transmission buffer memory device 10.

On the receiving side, the multiplexed signal received at an input terminal 5 via the transmission line 4 is sent to an information separator 29 to separate the coded information from the count information by detecting the identifying information. The thus separated coded information and count information are sent to a multiplexer 30 and a subtractor 32 respectively. A counter 31 is provided for counting a clock pulse at a period C (sec.) and sends count information to the subtractor 32 and an adder 33. The subtractor 32 subtracts the count information (N1) outputted from the counter 31 from the count information (Q1) sent from the information separator 29 to send the difference count information (Q1−N1) to the multiplexer 30. The multiplexer 30 multiplexes, on the time division basis, the coded information sent from the information separator 29 and the difference count information (Q1−N1) sent from the subtractor 32 and sends the thus multiplexed information, along with a write pulse, a receiving buffer memory device 11. Each time the write pulse and the multiplexed information are applied, the receiving buffer memory device 11 stores the multiplexed information in an address designated by the write address generator and advances, by one address, the write address designated by the write address generator to prepare for the next writing. When supplied with a read-out pulse from a read control circuit 15, the receiving buffer memory device 11 reads out the multiplexed signal stored in an address designated by a read address generator to send the read-out information to an information separator 12 and then advances, by one address, the address designated by the read address generator to prepare for the next reading. In this case, it is not necessary to supply the quantity of accumulated information in the receiving buffer memory device 11 to the other circuits. When supplied with the multiplexed information sent from the receiving buffer memory device 11, the information separator 12 separates the count information from the coded information by detecting the identifying code information and send them to the adder 33 and an interframe decoder 13, respectively. The interframe decoder 13 decodes, in an interframe fashion, the coded information to reproduce a video signal at an output terminal 7. When a counter 31 produces count information (N2) at a time when the information separator 12 produces the difference count information (Q1−N1), this means that the counter 31 counts (N2−N1) clock pulses during an interval between an instant at which the difference count information (Q1−N1) is written into the receiving buffer memory device 11 and an instant at which the difference count information is read out from this receiving buffer memory device. The adder 33 adds together the counter information (N2) and the difference count information (Q1−N1) respectively sent from the counter 31 and the information separator 12 to supply the sum count information (Q1+N2−N1) to the read control circuit 15.

When the difference between the sum information (Q1+N2−N1) and a predetermined reference value (No) is less than a predetermined permissible value, the read control circuit 15 sends to the receiving buffer memory device 11 a read-out pulse synchronous with the write pulse to read out the multiplexed information. Where the difference between the sum information (Q1+N2−N1) and the predetermined reference value (No) is larger than a predetermined permissible value and when the former is larger or smaller than the latter, the read control circuit 15 reads out the multiplexed information in vain (that is, reading of the information is temporarily stopped) until the difference becomes smaller than a predetermined permissible value. The sum information (Q1+N2−N1) sent out of the adder 33 is equal to the sum of count information (Q1) proportional to the information transmission delay time $\eta_1$ (second) in the transmission buffer memory device 10 and the count information (N2−N1) proportional to the information transmission delay time $\eta_2$ (sec) in the receiving buffer memory device 11. In other words, the following equation holds.

$$(Q1+N2-N1) \times C = \eta_1 + \eta_2 = \eta$$

where C represents the period (second) of a clock applied to the counters 27 and 31.

As a consequence, in order to make the sum $\eta$ (second) of the transmission delay times in the transmission and receiving buffer memory devices 10 and 11 coincident with a predetermined time $\eta_0$ (second), the time for reproducing the information from the receiving buffer memory device 11 is controlled by setting the reference value (No) to $\eta_0/C$.

As described above, in the system shown in FIG. 4, means is provided to obtain the count information proportional to the sum ($\eta = \eta_1 + \eta_2$) of the information transmission delay times $\eta_1$ and $\eta_2$ in the transmission and receiving buffer memory devices 10 and 11 and the read-out time of the information from the receiving memory device is controlled by a read control circuit 15 until the sum count information coincides with a reference value (No) so as to make the sum ($\eta$) of the information transmission delay times coincident with a predetermined time ($\eta_0$). In a typical digital transmission system of video signals, since the infromation transmission delay time (second) in the transmission line 4 does not vary with time, the information transmission delay time ($\sigma = \eta_0 + \delta$) between the transmission and receiving buffer memory devices 10 and 11 would also not vary with time, whereby it is possible to control the delay time such that it coincides with a predetermined time ($\sigma_0 = \eta_0 + \delta$). Consequently, even when the information transmission speed of the transmission line between the transmission and receiving buffer memory devices 10 and 11 varies with time, it is possible to correctly transmit and reproduce the information with a predetermined information transmission delay time ($\sigma_0$).

As described above, according to this invention, there is provided means for obtaining the count information proportional to the sum of the information transmission delay times in the transmission and receiving buffer memory devices, and the information reproducing time is controlled such that the count information coincides with a predetermined reference value. Accordingly, a digital transmission system is provided which is capable of correctly transmitting and reproducing the information without the necessity of adding an elaborate and complicated circuit, even when the information transmission speed in the transmission line varies with time.

It should be understood that the invention is not limited to a specific embodiment described above and that many changes and modifications will be obvious to one skilled in the art without departing the true spirit and scope of the invention as defined in the appended claims.

What is claimed is:

1. A digital transmitting system comprising:
   a transmission buffer memory device provided on a transmission side for effecting speed conversion between speeds of generation of communication information to be transmitted and of transmission thereof;
   a receiving buffer memory device provided on a receiving side for effecting speed conversion between the transmission speed and the reproducing speed of the communication information;
   said transmission side being provided with:
   first counting means counting the number of pulse signals having a predetermined period;
   first multiplexing means which multiplexes count information outputted from said first counting means and communication information at a predetermined interval and sends multiplexed information to the transmission buffer memory device;
   first information separating means receiving the multiplexed information to separate the communication information from the count information; and
   transmitting means which, when said first information separating means outputs the count information, subtracts the count information outputted from said first information separating means from the count information outputted from said first counting means and multiplexes resulting difference count information and the communication information sent from said first separating means for transmission of the thus multiplexed information; and
   said receiving side being provided with:
   receiving means receiving the mutliplexed information to separate the communication information from the count information for transmission the thus separated information;
   second counting means counting the number of the pulse signals having the predetermined period;
   second multiplexing means which, when the receiving means transmits the count information, multiplexes difference count information formed by subtracting the count information outputted from said second counting means from the thus transmitted count information and the communication information outputted from said transmitting means and which sends the thus multiplexed information to said receiving buffer memory device;
   second information separating means receiving the multiplexed information from said receiving buffer memory device to separate the communication information from the count information transmission;
   means for comparing a sum of the count information outputted from said second counting means and the information outputted from said second separating means with a predetermined reference value when said second separating means transmits the count information; and
   control means for setting a time for reproducing the communication information being transmitted from said receiving buffer memory device such that the delay time in transmission of the communication information between the transmission and receiving buffer memory devices will be in a predetermined range.

2. The digital transmitting system according to claim 1 which further comprises an interframe encoder which encodes, in an interframe fashion, said information to be transmitted, and means for applying an output signal of said interframe encoder to said first multiplexer together with an output signal of said first counting means.

3. The digital transmitting system according to claim 2 wherein said first multiplexing means multiplexes, on the time division basis and at a predetermined period, the coded information outputted from said interframe encoder and the count information outputted from said first counter means and added with identifying code information, multiplexed information outputted from said first multiplexing means being applied to said transmission buffer memory device together with a write pulse.

4. The digital transmitting system according to claim 1 wherein said transmitting buffer memory device stores the multiplexed information outputted from said first multiplexing means in an address designated by a predetermined write address signal and then advances said address by one to prepare for a next writing.

5. The digital transmitting system according to claim 1 wherein said transmission buffer memory device is supplied with a read pulse having speed corresponding to an information transmission speed in a transmission line extending between said transmitting side and said receiving side.

6. The digital transmitting system according to claim 2 which further comprises means for supplying information indicative of a quantity of information accumulated in said transmission buffer memory device to said interframe encoder for controlling a speed of generation of said coded information.

7. The digital transmitting system according to claim 2 wherein said receiving means comprises an information separator which receives the multiplexed information to separate the information being transmitted from the count information.

8. The digital transmitting system according to claim 7 which further includes a subtractor which subtracts a count value of said second counting means from an output signal outputted from said information separator and supplies different information to said second multiplexing means.

* * * * *